United States Patent [19]

Tejeda

[11] Patent Number: 4,486,283
[45] Date of Patent: Dec. 4, 1984

[54] MEMBRANE PROCESS FOR CONVERTING SODIUM SULFATE INTO SULFURIC ACID AND SODIUM CARBONATE

[76] Inventor: Alvaro R. Tejeda, 22 E. 29th St., New York, N.Y. 10016

[21] Appl. No.: 518,056

[22] Filed: Aug. 1, 1983

[51] Int. Cl.³ .............................................. B01D 13/02
[52] U.S. Cl. .................................. 204/180 P; 204/301
[58] Field of Search ............................. 204/180 P, 301

[56] References Cited

U.S. PATENT DOCUMENTS

| | | | |
|---|---|---|---|
| 4,082,835 | 4/1978 | Chlanda et al. | 204/180 P |
| 4,107,015 | 8/1978 | Chlanda et al. | 204/180 P |
| 4,238,305 | 12/1980 | Gancy et al. | 204/180 P |

Primary Examiner—John F. Niebling
Assistant Examiner—B. J. Boggs, Jr.
Attorney, Agent, or Firm—Kirschstein, Kirschstein, Ottinger & Israel

[57] ABSTRACT

A system for converting sodium sulfate ore into chemicals of which $H_2SO_4$ and $Na_2CO_3$ are examples, utilizing a membrane process, the basic electrodialysis cell of which is located, usually as a series of such cells, between cathode and anode compartments. Each cell constitutes a pair of cation permselective membranes between which a bi-polar membrane is disposed in spaced relationship thereto with the cation permselective face thereof confronting the cation permselective membrane and the anion permselective face thereof facing the other cation permselective membrane. The cation permselective membranes of adjacent cells are common to such adjacent cells. All of the cation permselective faces of the bi-polar membranes face the cathode electrode and all of the anion permselective faces of the bi-polar membranes face the anode electrode. Each cell includes a base zone and an acid zone. Each acid zone is defined by a cation permselective membrane and the confronting cation permselective face of the bi-polar membrane and each base zone is defined by a cation permselective membrane and the confronting anion permselective face of the same bi-polar membrane. The acid zone is fed by a water solution of a sodium salt, for example $Na_2SO_4$ and $Na_2S$ and the base zone is fed by a saturated water solution of $NaHCO_3$ or by a water solution of a mixture of $NaHCO_3$ and $Na_2CO_3$ or by a mixture of a water solution of $Na_2CO_3$ and $CO_2$ which reacts with the $Na_2CO_3$ to form $NaHCO_3$. The feeding of these composite solutions to the different zones results in increased current efficiencies by removing free $H^+$ ions from the acid zone and free $OH^-$ ions from the base zone. The cathode and anode electrodes are disposed in respective compartments through which water solutions of NaOH circulate. The cell is part of a plant in which other treatments are performed.

14 Claims, 4 Drawing Figures

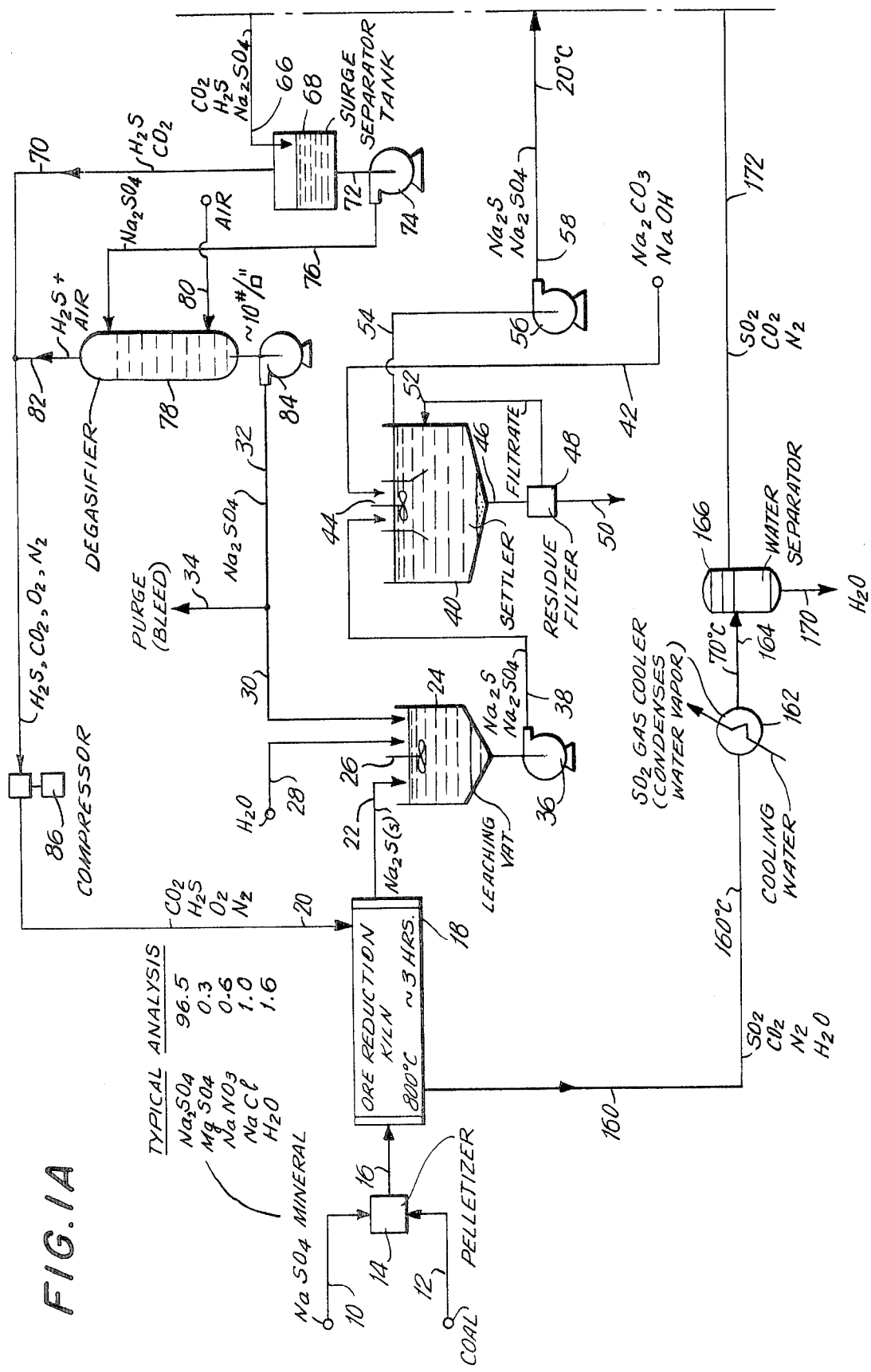
FIG. IA

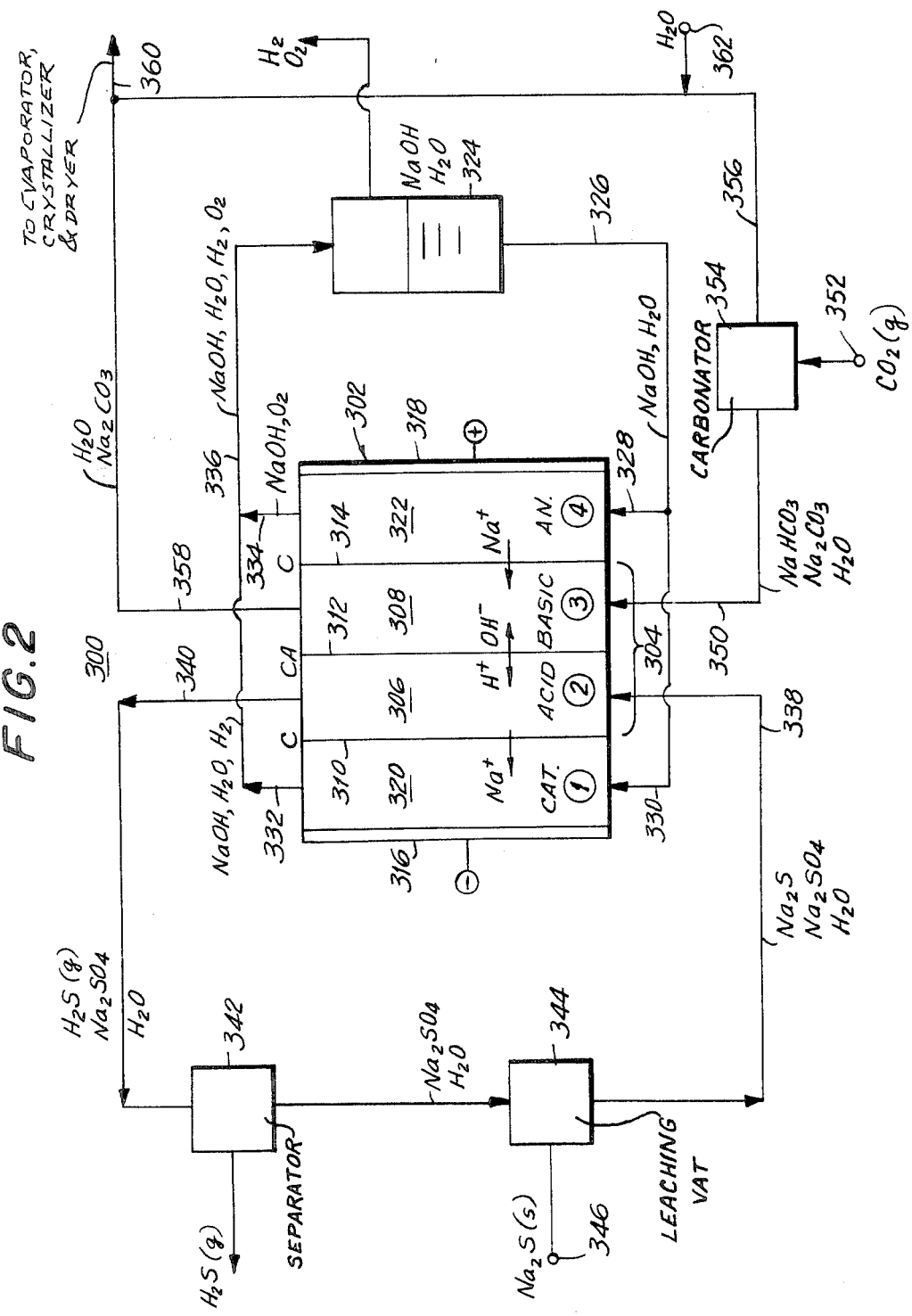

MEMBRANE PROCESS FOR CONVERTING SODIUM SULFATE INTO SULFURIC ACID AND SODIUM CARBONATE

BACKGROUND OF THE INVENTION

1. Field of the Invention

A membrane process and apparatus for economically converting $Na_2SO_4$ to $H_2SO_4$ and $Na_2CO_3$ on a large scale. The system is particularly useful where the $Na_2SO_4$ that is thus converted is extracted from ores. More particularly, the present invention is concerned with an apparatus and process that for said conversion utilizes a stack of many cells disposed between a cathode and an anode, the cells constituting a set of serially arranged pairs of acid and base zones of which each pair includes a pair of cation exchange membranes and an intermediate bi-polar membrane having a cation permselective face and an anion permselective face, as well as electrolytes which are different on opposite sides of the bi-polar membrane. Adjacent cells share a common cation exchange membrane.

2. Description of the Prior Art

The use of membrane systems for purification and conversion of sundry chemicals is well known. Anionic, cationic and bi-polar membranes are commercially manufactured by large companies. By way of example, attention is directed to U.S. Pat. Nos. 4,219,396 and 4,238,305 of Allied Chemical Corporation which disclose two versions of electrodialytic processes. The earlier of these relates to the electrodialysis of aqueous NaCl to produce high strength, high purity $Na_2CO_3$ and either high purity HCl or $CaCl_2$. In this process, a unit cell is employed having anion permselective, cation permselective and bi-polar membranes wherein the solutions on both sides of the anion permselective membranes are acidic. In U.S. Pat. No. 4,238,305 aqueous solutions of $Na_2CO_3$, $NaHCO_3$, trona ($NA_2CO_3 \cdot NaHCO_3 \cdot 2H_2O$) or mixtures thereof are converted into NaOH and $CO_2$. In the system of the '305 patent, an electrodialytic cell is employed having an anode compartment and a cathode compartment separated by base and acid zones between which a bi-polar membrane is located. Mention is also made of U.S. Pat. Nos. 3,220,941 and 3,438,879 which disclose the use of permselective membranes for the electrolysis of NaCl solutions to produce hydrogen gas, chlorine gas, NaOH, and $Na_2CO_3$. Other electrolytic processes are disclosed in U.S. Pat. Nos. 3,383,080; 3,787,304; 3,963,592 and 4,082,835. None of these is concerned with electrodialytic cells for producing $H_2SO_4$ and $Na_2CO_3$ from $Na_2SO_4$.

$Na_2SO_4$ is the commercially principal constituent of certain ores obtained from mines located in various parts of the world. For example, $Na_2SO_4$ ores are mined to a limited extent in Northern Chile, the ores usually being shipped, sometimes with refining but no conversion into useful chemicals, to other countries. Specifically, $Na_2SO_4$ occurs in great amounts in an anhydrous condition as thenardite at Tarapaca, Chile, and also is obtained from existing resources in the nitrate deposits of Pedro de Valdivia and Maria Elena, as well as in the Atacama salt flat, all in Chile's Great Northern Region. Other $Na_2SO_4$ ores of low and high grade are found in different parts of the world, examples being Canada, California and Arizona.

It would represent a great saving in manpower, energy, handling and transportation if the extraction of $Na_2SO_4$ from ores principally containing the same, and its conversion into useful chemicals such as $H_2SO_4$ and $Na_2CO_3$ and, optionally, S and NaOH, could be carried out in a simple, labor-efficient and energy-efficient manner on a large scale with relatively inexpensive equipment which does not require a high degree of expertise or engineering.

It is known that $Na_2SO_4$ can be reduced with the use of coal or natural gas to $Na_2S$ in accordance with the following equations:

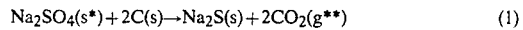

$$Na_2SO_4(s^*) + 2C(s) \rightarrow Na_2S(s) + 2CO_2(g^{**}) \quad (1)$$

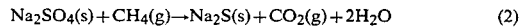

$$Na_2SO_4(s) + CH_4(g) \rightarrow Na_2S(s) + CO_2(g) + 2H_2O \quad (2)$$

*(s) indicates a substance in the form of a solid.

**(g) indicates a substance in the form of a gas. Where coal is used—equation (1)—the $Na_2S$ taken from the furnace is leached with water and the residue discarded to waste.

One of the difficulties attendant on electrodialysis is that although a permselective membrane is supposed to pass a given type of ion in one direction, as a matter of practice the permselective membrane also permits opposite types of ions to pass through it in the other direction, although to a lesser extent than the direction of the ions for which the permselective membrane was designed and intended. For example, a cation permselective membrane might be principally designed so that a given cell containing a solution of NaOH will pass sodium ions preferentially through such membrane toward the cell cathode. However, such membrane will also pass a lower proportion of hydroxide ions toward the cell anode. The back flow results in a considerable drop in efficiency of the electrodialytic cell.

For the kind of conversion system to which the present invention relates, that is to say, the system conversion of $Na_2SO_4$ to $H_2SO_4$ and $Na_2CO_3$, the difficulty just mentioned with respect to the cell would prevail as a result of the use of a bi-polar membrane except for the inclusion of certain new concepts that are incorporated in the manner set forth hereinafter.

SUMMARY OF THE INVENTION

1. Purposes of the Invention

It is an object of this invention to provide a system, namely, a process and apparatus, using a cell having cationic permselective membranes and a bi-polar membrane, which system will convert $Na_2SO_2$ in a water solution thereof into other chemicals having substantial commercial values.

It is another object of the invention to provide a system of the character described for converting $Na_2SO_4$ in a water solution thereof to $H_2SO_4$ and $Na_2CO_3$.

It is another object of the present invention to provide a system of the character described which, in addition to effecting the conversion as aforesaid, substantially eliminates water-soluble and water-insoluble salts present as impurities in the mined ore.

It is another object of the invention to provide a system of the character described which includes apparatus that is, considering the volume of material and complexity of operations, relatively inexpensive and simple, and does not require highly skilled labor nor extensive training for effective and efficient operation.

It is another object of the invention to provide a system of the character described which, due to its comparative simplicity, is capable of being erected and operated in relatively close proximity to a mine installation, providing that the same is reasonably close to an adequate source of electric power.

It is another object of the invention to provide a system of the character described which will operate on a continuous, as distinguished from batch, basis, and readily lends itself to a 24-hours-a-day, 7-days-a-week performance.

It is another object of the invention to provide a system of the character described which will provide end products such as $H_2SO_4$, $Na_2CO_3$ and NaOH of high purity.

It is another object of the invention to provide a system of the character described which operates at a relatively low power consumption and at a high efficiency.

It is another object of the invention to provide a system of the character described which can operate for long periods of time without shut-down.

It is another object of the invention to provide a system of the character described which in its operation does not appreciably precipitate insoluble materials requiring frequent cleanings of the electrodialytic cells.

Other objects of the invention in part will be obvious and in part will be pointed out hereinafter.

2. Brief Description of the Invention

The system of the present invention for converting ore-obtained $Na_2SO_4$ into various commercial products takes place in a plant which includes sundry operations that will be succinctly described below. Certain of these operations are themselves conventional, although, taken as a whole, they make up the novel system being described.

However, there is one particular phase of the operations which is quite unusual and which constitutes the heart of the instant invention. This now will be described before the short description of the overall operation. It is the electrodialytic cell of which several are serially arranged to form a stack located between a cathode and an anode. Such a cell consists of two spaced cation permselective membranes between which a bi-polar membrane is located. A bi-polar membrane is one having a cation permselective face and an anion permselective face. The series of such cells, i.e. the stack of cells, between the cathode and anode actually constitutes alternating membranes, namely, a cation permselective membrane, then a bi-polar membrane, then a cation permselective membrane, then a bi-polar membrane, then a cation permselective membrane, etc. The stack of cells has the cation permselective membranes in endmost positions, that is to say, the endmost membranes are cation permselective membranes which face the cathode and anode. The sundry membranes are spaced apart from adjacent membranes, each endmost membrane being spaced from the adjacent bi-polar membrane on one side, and from the electrode on the other side. Thus, at one end of the stack there is a cathode compartment which is the space between the cathode electrode and the adjacent cation permselective membrane, and at the other end of the stack there is an anode compartment between the cation permselective membrane and the anode electrode.

Preferably the end of the stack at the anode has an anion exchange face of a bi-polar membrane confronting and spaced from the anode electrode, that is to say, at this end of the stack the cation permselective membrane may be, and preferably is, omitted.

The space between the cation permselective face of any given bi-polar membrane and the cation permselective membrane which it confronts is an acid zone. The space on the other side of any given bi-polar membrane between its anion permselective face and the cation membrane that confronts it is a basic zone.

A stream of a water solution of NaOH is introduced into the cathode compartment. A stream of a water solution of NaOH and hydrogen gas is withdrawn from the cathode compartment. A stream of a water solution of $Na_2SO_4$ and $Na_2S$ is introduced into the acid zone, and a stream of a water solution of $Na_2SO_4$ and of hydrogen sulfide gas is withdrawn from the acid zone. A stream of a water solution of saturated $NaHCO_3$ is introduced into the basic zone, and a stream of a water solution of unsaturated $NaHCO_3$ and $Na_2CO_3$ is withdrawn from the basic zone. A stream of a water solution of NaOH is introduced into the anode compartment, and a stream of a water solution of NaOH and of oxygen gas is withdrawn from the anode compartment.

The stream withdrawn from the acid zone is treated to separate the hydrogen sulfide gas from the water solution of $Na_2SO_4$. The water solution of $Na_2SO_4$ then is recirculated back to the acid zone. The water solution of $NaHCO_3$ and $Na_2CO_3$ withdrawn from the base zone is recycled to a point of $CO_2$ injection, after which, the $NaHCO_3$ 3 is introduced back into the base zone. The $Na_2CO_3$ will react with the $CO_2$ to to form $NaHCO_3$. Usually electrodialytic treatment does not convert all of the $NaHCO_3$ to $Na_2CO_3$, so that the stream withdrawn from the basic zone includes both $Na_2CO_3$ and $NaHCO_3$ dissolved in water.

A suitable direct current is applied to the cathode and anode to perform the necessary electrodialysis of the different solutions passing through the cells.

Forming part of the complete system which cooperates with the electrodialytic cell are several other apparatuses and operations which will only briefly be described at this point and which, in toto, form the entire system for effecting the conversion of the salt-carrying ore into more commercially valuable chemicals.

Although the preferred form of the invention relates to the treatment of $Na_2SO_4$-containing ores, the invention also will function where the ore introduced in water solution into the acid zone includes NaCl and/or $NaNO_3$.

If $CO_2$ is not injected into the effluent from the base zone, the stream withdrawn from the base zone will be concentrated NaOH, which can be recovered for commercial sale. In that event, the stream entering said zone will be dilute NaOH.

First the $Na_2SO_4$ contained in the ore is reduced in a kiln with coal or natural gas to reduce the $Na_2SO_4$ in the presence of heat resulting from burning $H_2S$ from the acid zone of the dialytic cell with air at the end of the kiln, thereby yielding $Na_2S$, $SO_2$, $CO_2$, $N_2$ and water vapor. The $Na_2S$ with $Na_2SO_4$ added to it is introduced into the acid zone. The $SO_2$ is pumped into a sulfuric acid contact plant where it is reacted with $O_2$ to form $SO_3$ which, in the presence of water, forms $H_2SO_4$, one of the commercially important end products of the system.

The $NaHCO_3$ and $Na_2CO_3$ withdrawn from the base zone in water solution, upon carbonation, form a saturated solution of $NaHCO_3$ containing crystals of solid $NaHCO_3$. The crystals are separated out, and the saturated solution of $NaHCO_3$ is cooled to precipitate additional $NaHCO_3$ crystals which likewise are separated out. The damp $NaHCO_3$ crystals are conveyed to a bicarbonate kiln where the heat converts them to $Na_2$-

$CO_3$, the other principal end product of the system, emitting $CO_2$ which is fed back to the $NaHCO_3$, $Na_2CO_3$ water stream withdrawn from the basic zone to convert the $Na_2CO_3$ in such stream to $NaHCO_3$.

The invention consists in the combination of elements and series of steps which will be examplified in the system hereinafter described and of which the scope of application will be indicated in the appended claims.

BRIEF DESCRIPTION OF THE DRAWINGS

In the accompanying drawings, in which are shown various possible embodiments of the invention:

FIGS. 1A, 1B and 1C, when combined, constitute a process chart of a plant for carrying out the conversion of $Na_2SO_4$-containing ore into $H_2SO_4$ and solid $Na_2CO_3$; and FIG. 2 is a process chart of an electrodialytic apparatus embodying a slightly modified form of the invention.

DESCRIPTION OF THE PREFERRED EMBODIMENT

Figure 1B:
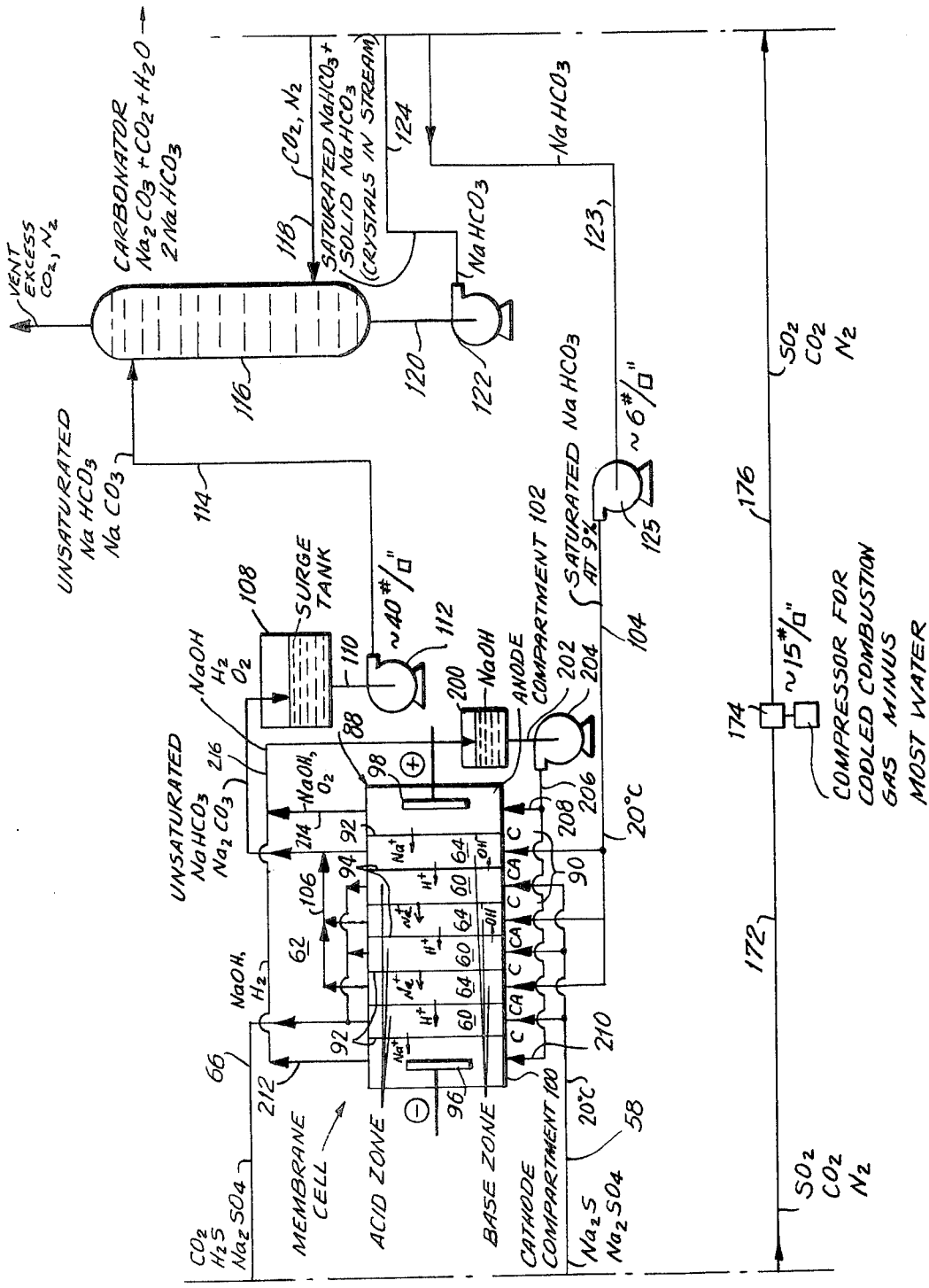
Figure 1C:
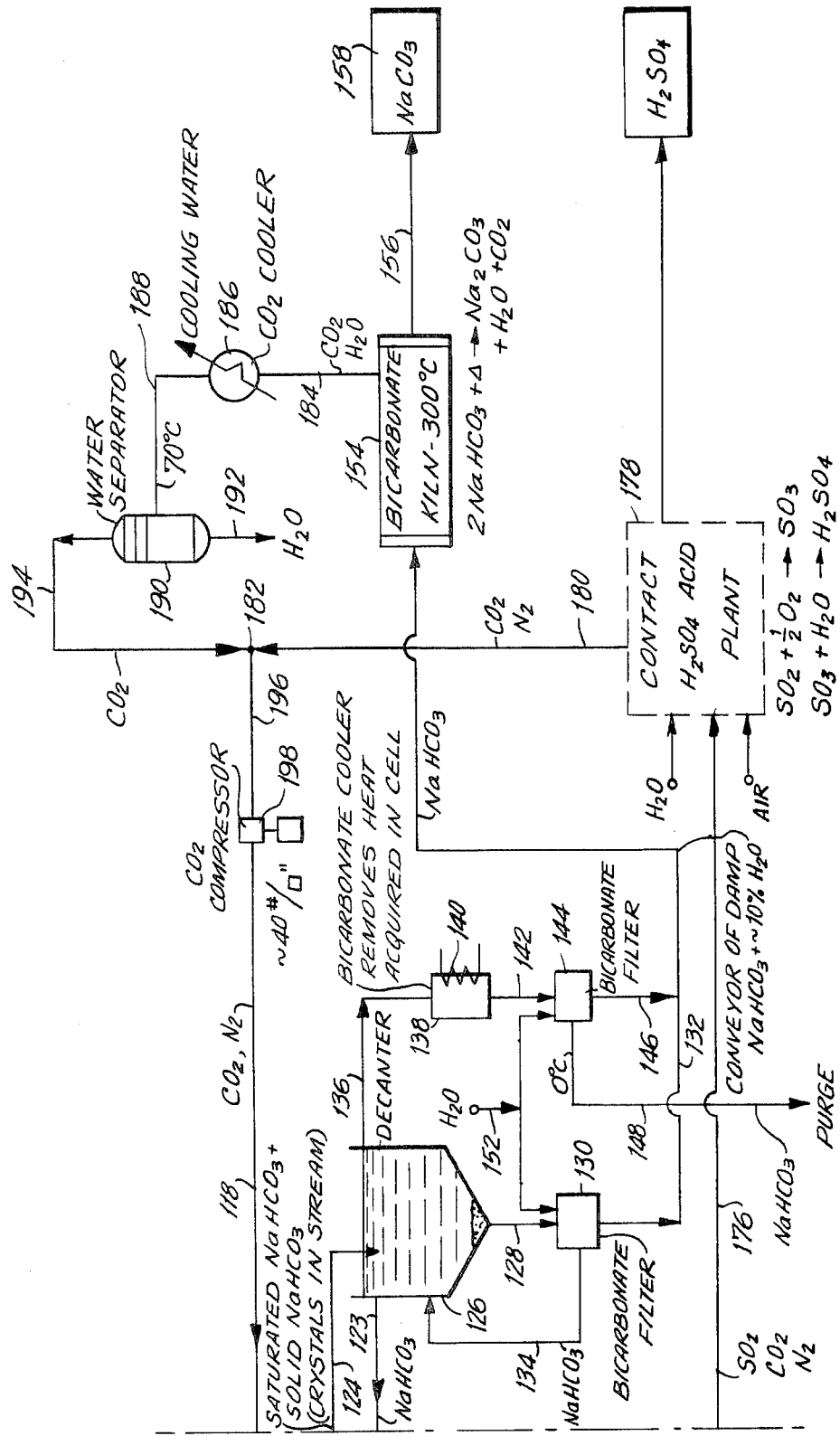

Referring now to FIGS. 1A, 1B and 1C, there is shown a process chart which diagrammatically illustrates the various pieces of equipment employed, the sundry process steps, the chemicals present at different parts of the system, and approximations of temperatures and pressures preferably prevailing at certain parts of the system, these latter being illustrated only by way of example.

In the apparatus and process as shown, mined ore, denoted by the reference numeral 10, in crushed condition and principally consisting of $Na_2SO_4$, e.g. thenardite, is admixed with powdered coal 12, the two being conveyed to a pelletizer 14 to form granules in which the ore and coal are intimately mingled with one another, and fed out as a stream 16 to an ore reduction kiln 18.

A typical analysis for the ore is $Na_2SO_4$ 96.5%, $MgSO_4$ 0.3%, $NaNO_3$ 0.6%, $NaCl$ 1.0%, and $H_2O$ 1.6%, all percentages being by weight. By way of example, a preferred temperature at which the kiln is maintained is 800° C. The kiln is operated on a continuous basis, as distinguished from a batch basis, which is to say, the pellets are moved slowly through the kiln from its infeed end to its outfeed end. The residence time of the pellets in the kiln is approximately three hours, which is sufficient to effect the desired reduction of the ore to $Na_2S$. The kiln may be of a rotary cylindrical type which is slow turning, or it may simply be a tube through which a conveyor slowly moves the ore while the pellets are being subjected to the mentioned temperature. The chemical reaction effected in the kiln is that indicated by equation (1). Of course, due to the presence of impurities, other reactions also take place which are not significant to the instant process since, as later will be pointed out, the converted impurities are substantially removed.

To maintain the requisite temperature within the kiln, a gaseous stream 20 is fed into the kiln near the output end thereof, the same including $CO_2$ from a source later to be described, $H_2S$ from a source later to be described, and air likewise from a source later to be described, the air obviously principally comprising $O_2$ and $N_2$. The heat created in the kiln for the purpose of ore reduction arises from the burning of $H_2S$ in the stream 20.

The solids resulting from the reduction in the kiln 18, and which principally are composed of $Na_2S$, exit as a stream 22.

The solids stream 22, largely composed of $Na_2S$ and also containing ash, is fed to a leaching vat 24 containing a suitable agitating means such, for example as a stirrer 26. Also fed into the leaching vat is a stream of water 28 for the purpose of maintaining the $H_2O$ balance and dissolving the $Na_2S$. Furthermore, there is fed into the leaching vat a stream 30 of a water solution of $Na_2SO_4$ from which there has been purged or bled off a certain percentage in order to control impurities. A stream 32 from which the bleed has been taken includes a water solution of $Na_2SO_4$ and impurities, the bleed being taken off by a bleed stream 34.

The control of impurities by the use of a bleed stream is a well-known expedient in the treatment of ores.

The conjoint stream of the water solution of $Na_2S$ and the water solution of $Na_2SO_4$ with impurities, the latter stream having been partially bled as just mentioned, is withdrawn throuth a pump 36 to form a stream 38 of the conjoine solutions, i.e. a stream containing $Na_2S$ and $Na_2SO_4$ in water solution together with impurities, this stream being fed to a settler 40 which also has fed to it a stream 42 of a water solution of $Na_2CO_3$ and $NaOH$. The sodium hydroxide reacts with water-soluble salts of magnesium and the sodium carbonate reacts with other non-alkali metals that may be present to form water insoluble salts that precipitate in the settler 40. Suitable agitating means such as a stirrer 44 is included to keep the liquid in the settler moving, but not sufficient to prevent settlement of the sediment therein of particulate non-water-soluble solids which include the slag resulting from the reduction of the ore in the kiln.

This precipitated material is drawn off from the bottom of the settler 40 through a line 46, passed through a filter 48, and discarded to waste 50. The filtrate from the filter is fed back into the settler through a line 52. The supernatant liquid is drawn off the top of the settler through a line 54 by a pump 56, this supernatant liquid being delivered to a line 58 and containing a water solution of $Na_2S$ and $Na_2SO_4$ which is, to all intents and purposes, free of water-insoluble impurities.

At this time, the temperature of the stream in the line 58 is at approximately room temperature, i.e. about 20° C. The feed from the line 58 is delivered to all of the acid zones 60 of an electrodialytic apparatus 62, the details of which will be described subsequently. At this point, it is simply mentioned in order to understand that it represents one of the feed input points of the equipment thus far detailed. Other feed input points and feed output points for said apparatus 62 subsequently will be described.

The effluent from all of the acid zones 60 of the electrodialytic apparatus 62 leaves through a line 66 which, as later will be seen, contains mainly $Na_2SO_4$ and the gas $H_2S$ and water together with minor amounts of water-soluble impurities including, for example, $NaNO_3$, $NaCl$ and $CO_2$. The liquid from the line 66 delivers into a surge separator tank 68 from which the gaseous content, namely, $H_2S$ and $CO_2$, leaves through a line 70. A liquid solution of $Na_2SO_4$ leaves the tank 68 through a line 72, being drawn by a pump 74 which discharges said $Na_2SO_4$ water solution to a line 76 exiting at a degasifier 78. Air is fed through a line 80 to near the bottom of the degasifier.

In the degasifier, air with entrained $H_2S$ gas which has not been fully removed in the surge separator tank 68 leaves from the top of the degasifier through a line 82, entering into the line 70 which already contains a mixture of $H_2S$ gas and $CO_2$. A pump 84 draws a water solution of $Na_2SO_4$ from the bottom of the degasifier and discharges it at a mild pressure of about 10 lbs. per square inch as the stream 32 previously mentioned which is bled at 34 before exiting to the leaching vat 24. The gas stream 70 of $H_2S$, $CO_2$, $O_2$ and $N_2$ is led to a compressor 86 which supplies the gaseous stream 20 that feeds it to adjacent the output end of the kiln 18, where the $H_2S$ content of said stream burns in the kiln to furnish heat.

Turning now to the principal characterizing element of the present invention—the electrodialytic apparatus 62—the same is composed of a stack of electrodialytic cells arranged seriatim, that is to say, in series, and disposed between a cathode and an anode.

In the preferred form of the invention, the cells are composed of parallel flat membranes detailed hereinafter, although the flatness of the membranes is simply convenient. The parallelism of the membranes is desirable, although not absolutely necessary. The membranes conventionally are furnished in the form of sheets, and it is most convenient to make flat panels from the sheets and mount them in the form of flat elements spaced apart from one another as now will be described. Under some circumstances, the membranes can be arranged as a series of concentric circles of increasing radii but, as a practical matter, this is not desirable because of the unequal surface areas of successive membranes.

The membranes are mounted, as is conventional in electrodialytic apparatuses, in spaced relationship to one another by means of liquid-permeable electrically-non-conductive spacers.

Specifically, any given electrodialytic cell of a stack of said cells in the electrodialytic apparatus 62 is composed of three membranes which are, in sequence, a cation exchange membrane, a bi-polar membrane having a cation permselective face and an anion permselective face, and another cation permselective membrane. Thus, the bi-polar membrane is between two cation exchange membranes, on opposite sides thereof but spaced from both.

Suitable electrolytes, which will be described later, circulate through the spaces between each cation permselective membrane and the bi-polar membrane which it faces. Each cation permselective membrane is common to two adjacent electrodialytic cells, so that viewing the stack as a whole, exclusive of the electrodes, the same constitutes an endmost cation permselective membrane, a bi-polar membrane, a cation permselective membrane, etc., terminating at a cation permselective membrane at the other end or, if desired, at the anode end of the stack at a bi-polar membrane the anion permselective face of which confronts the anode electrode. The cathode electrode faces and is spaced from one endmost cation permselective membrane, and the anode electrode faces and is spaced from the other endmost cation permselective membrane or the anion permselective face of an endmost bi-polar membrane if the normally associated endmost cation permselective membrane is omitted.

Thus, any given cation permselective membrane, except an endmost one, faces two bi-polar membranes. The bi-polar membrane that the cation permselective membrane faces on one side presents to such cation permselective membrane its cation permselective face, and the bi-polar membrane that said cation permselective membrane faces on its other side presents its anion permselective face. All of the bi-polar membranes have their cation permselective faces facing in the same direction which is toward the cathode electrode, and their anion permselective faces facing in the same direction toward the anode electrode.

As already observed previously, the influx to all of the acid zones is from the line 58, and consists of a water solution of $Na_2S$ and $Na_2SO_4$, and the effluent from all of the acid zones 60 principally comprises a water solution of $Na_2SO_4$, $H_2S$ gas, and impurities such as $NaNO_3$, $NaCl$ and $CO_2$ which exit through the line 66 leading to the surge separator tank 68.

Referring now in detail to the electrolytic apparatus 62, the same includes a stack 88 of electrodialytic cells 90. Each cell is composed of a pair of cation permselective membranes 92 located on opposite sides of and spaced from a bi-polar membrane 94 so that a complete stack has the membranes arranged thusly: cation permselective membrane—bi-polar membrane—cation permselective membrane—bi-polar membrane—cation permselective membrane ... cation permselective membrane, it being observed that the endmost membranes are cation permselective membranes 92 so that in a complete stack of cells there will be x bi-polar membranes and x+1 cation permselective membranes (except where one endmost cation permselective membrane is omitted).

The apparatus 62 further includes a cathode electrode 96 and an anode electrode 98 located at opposite ends of the cell and respectively spaced from their adjacent endmost cation permselective membranes. The cathode electrode together with its adjacent spaced cation permselective membrane 92 defines a cathode compartment 100. The anode electrode 98 together with its adjacent spaced endmost cation permselective membrane forms an anode compartment 102. The anode compartment and cathode compartments are filled with a suitable electrolyte.

The materials used for the cation permselective membranes and for the bi-polar membranes can be any materials well-known in the electrodialytic art. Examples thereof are, for the cation permselective membrane: CZL 183 manufactured by IONICS, INC.; MC 3142 and MC 3470 manufactured by IONAC CHEMICAL OF SYBRON CORP.; K 101, CK1, DK1 manufactured by ASAHI CHEMICAL INDUSTRY CO., LTD., the Flemion membrane manufactured by ASAHI GLASS CO.; R5010 manufactured by the Membrane Division of RAI RESEARCH CORPORATION, and Nafion made by DUPONT.

Another suitable cation permselective membrane was prepared by casting on a glass plate a paste made of a mixture of 25 percent by weight of a cation exchange resin powder (IRP 69, 100–500 mesh, made by ROHM & HAAS COMPANY), 25 percent by weight of polyethylene powder such as "MICROTHENE", 100–500 mesh made by USI CHEMICALS and 50 percent water. The water was then slowly evaporated at a mildly elevated temperature long enough to evaporate the water and partially fuse the polyethylene powder, e.g., for about eight minutes, and the partially fused film was stripped from the glass plate and fused between two aluminum plates coated with a silicone mold release agent at a temperature of about 300° F. for about 10 minutes. The resulting membrane was stripped from the aluminum plates and soaked in hot water of about 80° C. for 24 hours before use.

Typical bi-polar membranes are described in U.S. Pat. Nos. 2,829,095; 4,024,043; 4,140,815; 4,116,889; and 4,238,305.

Another bi-polar membrane was prepared by casting on a glass plate as aforesaid, a paste constituting a mixture of equal parts by weight of 25 percent cation exchange resin powder, ROHM & HAAS's IRP 69 and 25 percent by weight polyethylene powder with the balance water and after evaporation of the water for about eight minutes casting on the partially fused film a paste made of 25 percent by weight of an anion exchange resin powder, IRP 67, 100–500 mesh, made by ROHM & HAAS, together with 25 percent by weight "MICROTHENE POWDER", plus 50 percent by weight of water. The water was evaporated from the second casting as well. The evaporation from both castings was for about 8 minutes. Thereafter, the partially fused stripped composite film was fused as in the case of the cation exchange membranes. The resulting bi-polar membrane was stripped from the aluminum plates and soaked in hot water of about 80° C. for 24 hours before use.

The electrodialytic action which takes place in the acid zone 60 of each cell is a release of positive hydrogen ions $H^+$ into said zone by the splitting of water at the cation permselective face of the bi-polar membrane 94. Also present into said acid zone are sulphate ions $SO_4^-$ by the disassociation of $Na_2SO_4$; the $H^+$ ions and the $SO_4^-$ ions combine to form $H_2SO_4$ in the acid zones according to the equation $$2H^+ + SO_4^- \rightarrow H_2SO_4 \quad (3)$$

While this is occurring, a chemical reaction takes place between the $H_2SO_4$ and the $Na_2S$ being fed into the acid zone from the line 58. This reaction can be expressed as follows:

$$Na_2S + H_2SO_4 \rightarrow Na_2SO_4 + H_2S(g) \quad (4)$$

It will be observed that one of the disadvantages of disassociating $Na_2SO_4$ in an electrodialytic cell is the production of $H_2SO_4$ as one of the products which is undesirable because the presence of free $H^+$ ions in the acid zone lowers the efficiency of the cell and this has been overcome pursuant to the instant invention by the injection of $Na_2S$ at this point in the process to convert $H_2SO_4$ to $Na_2SO_4$ and $H_2S$ gas.

Now considering the base zones 64, a line 104 feeds a saturated water solution of $NaHCO_3$ into the same and another line 106 draws from such base zones unsaturated water solutions of $NaHCO_3$ and $Na_2CO_3$. In such base zones, $OH^-$ ions are released by water splitting from the anion permselective faces of the bi-polar membranes 94. At the same time, $Na^+$ ions are transferred from the cation permselective membranes 92. The $OH^-$ and $Na^+$ ions combine to form $NaOH$. The $NaOH$ reacts with $NaHCO_3$ entering the base zones in water solution through the line 104 to form $Na_2CO_3$ and water according to the equation.

$$NaHCO_3 + NaOH \rightarrow Na_2CO_3 + H_2O \quad (5)$$

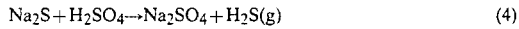

Thereby the presence of free $OH^-$ ions in the base zone is lowered to increase the efficiency of the cell. Hence, because $NaHCO_3$ is fed into the base zones rather than $Na_2CO_3$ (due to the carbonation of the $Na_2CO_3$) the cell efficiency is raised.

The line 106 discharges into a surge tank 108 and from the tank into a line 110 that leads to a pump 112 which builds up the pressure of the combined unsaturated water solutions of $Na_2CO_3$ and $NaHCO_3$ to about 40 lbs. per square inch. The pump 112 feeds a line 114 which exits into the top of a carbonator 116 into the bottom of which compressed $CO_2$ at a pressure of about 40 lbs. per square inch is fed through a line 118. A carbonation reaction takes place within the carbonator according to the following equation:

$$Na_2CO_3 + CO_2 + H_2O \rightarrow 2NaHCO_3 \quad (6)$$

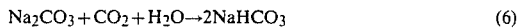

resulting in a conversion of substantially all of the $Na_2CO_3$ into $NaHCO_3$ which is discharged in water solution through a line 120 to a pump 122, the effluent from which flows through a line 124 into a decanter tank 126. A line 123 draws a supernatent saturated water solution of $NaHCO_3$ from the decanter tank 126 to a pump 125 which discharges the solution at a pressure of about 6 lbs. per square inch into the line 104 leading into the base zones 64.

The line 124 contains a stream of water which is fully saturated with $NaHCO_3$ and also includes therein crystals of solid $NaHCO_3$, the conversion of the $Na_2CO_3$ in the carbonator having given rise to this condition. In the decanter tank the solid crystals of $NaHCO_3$ settle to the bottom of the tank as shown on the process sheet where they are drawn along with fluid into a line 128 leading to a $NaHCO_3$ filter 130 that separates the solid $NaHCO_3$ crystals and discharges them on to a conveyor 132. The bicarbonate filtrate from which the solid crystals are separated is withdrawn from the filter and passed back to the decanter tank through a line 134. The crystals on the conveyor are damp $NaHCO_3$ crystals with approximately 10 percent of water present therein. The point to which they are taken and additions to the materials on the conveyer will be discussed below.

Supernatent fluid in the decanter tank also is drawn off through a line 136. It will be realized that this fluid is very high in its $NaHCO_3$ content, indeed, fully saturated and will be at a somewhat elevated temperature due to the heat energy transfer to it during the electrodialytic action occurring in the cells. Inasmuch as the $NaHCO_3$ is a byproduct of the electrodialysis which immediately precedes a commercially available end product, it is of economic interest to reduce the amount of dissolved $NaHCO_3$ contained in the line 136. Accordingly, the line 136 leads to an $NaHCO_3$ cooler 138 which in effect is a heat exchanger containing a cooling coil 140 therein in good heat exchange contact with the $NaHCO_3$ solution flowing through the heat exchanger. The particular cooler illustrated has been shown only diagrammatically. It will be realized that any commercially acceptable heat exchanger with good heat exchange efficiency can be used as for example a tubular heat exchanger or a serpentine heat exchanger. In the heat exchanger the warm saturated water solution of $NaHCO_3$ flows alongside one surface of a metal element of good heat conductivity along the opposite surface of which a considerably cooler liquid flows such, for example, as water or a mixed solution of water and a lower alkyl straight chain aliphatic alcohol, e.g. wood alcohol, having a freezing point below the freezing point of water and at a temperature below 32° F. although above the freezing point of the mixture. Due to the reduction of temperature and hence, the reduction of the saturation point of the aqueous NaHCO₃ solution, a precipitation of NaHCO₃ crystals will take place in the aqueous stream of NaHCO₃ flowing through the NaHCO₃ cooler 138 and this stream containing the aqueous solution of dissolved NaHCO₃ at a temperature such for instance as 0° C. will also contain suspended crystals of solid NaHCO₃ in a line 142 leading to a second NaHCO₃ filter 144. The damp NaHCO₃ crystals separated in the filter 144 are led by a line 146 to the conveyor 132 where they join the damp NaHCO₃ crystals previously deposited on the conveyor from the filter 130. The filtrate of an aqueous solution of NaHCO₃ separated out in the filter 144 is discharged to waste through a line 148 as indicated on the process sheet. Water is added as indicated through the line 152 to wash the crystals of NaHCO₃. The combined deposits of damp NaHCO₃ deposited on the conveyor 132 are transferred by the conveyor to a NaHCO₃ kiln 154 where they are subjected to a mildly elevated temperature, e.g. of about 300° C. to drive off the water present and also to convert the NaHCO₃ to one of the final commercially desirable end products of the process and system, namely, Na₂CO₃ according to the equation:

$$2NaHCO_3 + \Delta \rightarrow Na_2CO_3 + H_2O + CO_2 \uparrow \qquad (7)$$

The dry Na₂CO₃ is transferred by a conveyor 156 to a repository 158 from which it is to be taken for shipment. The Na₂CO₃ is of a high degree of purity meeting all ordinary commercial standards.

Reverting now to the ore reduction kiln 18, the solid output from which has been discussed in detail, it will be recalled that there are gaseous products of combustion resulting from the combustion of H₂S, namely SO₂ and water vapor. These, together with inert gases constituting carbon dioxide and N₂ lease the kiln by a conduit 160. A typical temperature for this mixture of gases is about 160° C. The conduit 160 leads the gases initially to an SO₂ cooler 162, so denominated because the principal constituent of interest is sulfur dioxide. The gas cooler is essentially a heat exchanger. The cooling fluid is water which reduces the temperature passing therethrough to below the condensation point of water, in the example being described to about 70° C., which causes a considerable amount of the water vapor in the gases issuing from the kiln to be condensed to the form of droplets present in the stream passing through the line 164 issuing from the cooler 162. The line 164 discharges to a water separator 166 of any known construction, for example a trap-type separator in which the water-particle-purged cooled stream passes through a fine screen at a velocity sufficiently slow to trap particles and discharge them to waste through a line 170. The cooled combustion gas stream leaving the water separator through a line 172 and from which most of the water has been removed and furthermore which essentially consists of SO₂, CO₂ and N₂, is directed by the line 172 to a compressor 174 at which the pressure of the stream is raised somewhat, to about 15 lbs. per square inch, and then fed to a line 176. These compressed gases now reach a contact H₂SO₄ plant 178 which operates pursuant to known chemistry and the construction of which is well recognized. In this plant, the following reactions take place which relate solely to the SO₂ contained in the gas stream passing through the line 176 according to the equations:

$$SO_2 + \tfrac{1}{2}O_2 \rightarrow SO_3 \qquad (8)$$

$$SO_3 + H_2O \rightarrow H_2SO_4 \qquad (9)$$

The H₂SO₄ thus produced is about 98% concentrated and is of high purity. It is commercially acceptable and is fully saleable. It is stored in any conventional manner to be ready for shipment. It is the other basic end product of the within process and system. Also fed into the plant 178 is water and air.

The plant 178 does not consume either the CO₂ or the N₂ entering into it through the line 176. These two gases exit the plant 178 through the line 180 to a junction point 182.

When the damp NaHCO₃ from the conveyor 132 is converted in the NaHCO₃ kiln 154 to Na₂CO₃, one of the byproducts is the gas CO₂ which leaves the kiln 154 through a line 184 together with water vapor. These are cooled in a CO₂ cooler 186 and exit through a line 188 which conveys the cooled gases to a water separator 190. Water leaves the water separator 190 to waste thru a line 192. The now relatively dry CO₂ leaves the separator 190 through a line 194 which conducts such CO₂ to the junction point 182 where it joins the stream of CO₂ and N₂ issuing from the line 180. This combined stream enters the line 196 which runs to a compressor 198 that raises the pressure of the gases to about 40 lbs. per square inch, discharging the compressed CO₂ and N₂ into the line 118 that leads to the carbonator 116.

As has been mentioned above in the Brief Description of the Invention, NaOH is the electrolyte present in the cathode and anode compartments. This is the preferred electrolyte employed in the electrodialytic apparatus 62. More specifically, there is provided a tank 200 containing NaOH from which a line 202 leads to a pump 204, the output from which runs to a line 206 that is connected to branches 208, 210. The branch 208 leads to the anode compartment 102, and the branch 210 leads to the cathode compartment 100. NaOH plus H₂ leaves as an effluent from the cathode compartment 100 through a branch 212, and NaOH plus O₂ leaves as an effluent from the anode compartment through a branch 214. These branches enter a common line 216 that returns to the tank 200. This type of circulation of an NaOH electrolyte through the electrode chambers of an electrodialytic apparatus is disclosed in U.S. Pat. Ser. No. 3,869,376 in connection with the use of ferrous electrodes, but it is also useful for stainless steel electrodes such as are preferably employed in the plant being described herein.

If desired, the H₂S obtained from the electrodialytic apparatus 62 does not have to be sent back to the ore reduction kiln 18 so as to heat the same for the purpose of reducing Na₂SO₄ therein to Na₂S. Alternatively, other sources of heat can be utilized. Thus, additional coal can be fed into the ore reduction kiln, that is to say, coal in an amount in excess of that required for the reduction of the Na₂SO₄, together with enough air to burn the additional coal to yield the necessary heat for the reduction of the Na₂SO₄; or, if a gas such as CH₄ is fed into the kiln to reduce the Na₂SO₄, enough gas can be used, together with excess air, to furnish heat in an amount sufficient to raise the temperature of the kiln to the point where the Na₂SO₄ will be reduced. Still further, if desired, other fossil fuels, e.g. oil, can be furned in the kiln to raise the temperature thereof to the desired level for the reduction of the $Na_2SO_4$. In all these cases, where an external source of energy is supplied for raising the temperature of the kiln, that is to say, a source of energy external to the process being practiced in the plant, the $H_2S$ yielded by the electrodialytic apparatus can be burned in equipment other than the kiln, for example, a boiler, to produce steam, hot water, or for some other industrial purpose. In that event, the product of the combustion of $H_2S$ with $O_2$ will be $SO_2$, which then is oxidized to $SO_3$ and combined with water in an $H_2SO_4$ contact plant to yield the product $H_2SO_4$.

In order to better appreciate the invention, a few typical examples will be given for a four-compartment electrodialytic apparatus comprising a single cell stack consisting of a cathode compartment defined by a cathode electrode and a first cation compartment defined by a cathode electrode and a first cation permselective membrane spaced therefrom, an acid zone defined by said first cation permselective membrane and a bi-polar membrane having its cation exchange face confronting the cation permselective membrane and spaced therefrom, a base zone defined by said bi-polar membrane and a second cation permselective membrane confronting the anion exchange face of the bi-polar membrane and spaced therefrom, and an anode compartment defined by said second cation permselective membrane and an anode electrode and spaced therefrom.

The electrode plates for both the anode and the cathode were stainless steel (No. 304) plates, 1/16 inch thick and were of rectangular configuration, being 9 inches high and 6 inches wide. The cation permselective membranes and the bi-polar membrane were prepared by the casting method detailed above. The effective areas of the sundry membranes and electrodes were 4"×7"or 0.2 sq. ft. The thickness of all compartments and zones were 0.1 cm. Typical experimental runs follow:

EXPERIMENTAL EXAMPLE NO. 1

| System | |
|---|---|
| Acid Side | Base Side |
| NaCl, Na$_2$S | Na$_7$CO$_3$, CO$_2$ |

The acid zone was charged from a tank with a water solution of 42.0 g/l $Na_2S$ and 63.0 g/l NaCl. The base zone was charged from a base tank with a one liter water solution of 110.3 g/l $Na_2CO_3$, and the electrode compartments were charged with a water solution of 100 g/l NaOH from a common tank. All of these solutions were recirculated from their respective tanks through their respective compartments and zones at a rate of 180 cm$^3$/min. Four auxiliary tanks were charged with ½ liter water solution, each containing 100 g/l $CuSO_4$. The acid tank gas space was connected to the first $CuSO_4$ tank into which the $H_2S$ generated by the cell was bubbled. All four $CuSO_4$ tanks were connected in series for the recovery of the $H_2S$ gas. A direct current of 8 amperes was applied to the apparatus for 3 hrs. and a stream of $CO_2$ was injected into the bottom of the base tank at a rate of 170 cm$^3$/min. The $H_2S$ produced at the acid zone was recovered (in the four $CuSO_4$ tanks connected in series) as insoluble CuS, which, after the run, was filtered, dried and weighed. The initial and final solution in the base tank was analyzed by titration of the $Na_2CO_3$ with 0.2N $H_2SO_4$ using phenolphthalein as an indicator. The rate of $CO_2$ was adjusted so as to maintain a pH of about 8 in the base tank to avoid formation of $HCO_3^-$. After the passage of current, the results of the run were as follows:

Acid Zone

The insoluble CuS collected as a result of the reaction $CuSO_4 + H_2S \rightarrow CuS + H_2O$ was 38.3 g. The theoretical CuS at 100% current efficiency is calculated as follows:

CuS (at 100% efficiency) =

$$\frac{\text{current} \times \text{time (in seconds)} \times \text{eq. wt. CuS}}{\text{Faraday's constant}} =$$

$$\frac{8 \times (3600 \times 3) \times 47.75}{96,500} = 42.8 \text{ g}$$

The actual current efficiency was therefore:

$$(38.3/42.8) \times 100 = 89.5\%$$

Base Zone
Initial vol. base tank = 1.0 l.
Initial $Na_2CO_3$ concentration base tank = 110.3 g/l.
Total initial amount $Na_2CO_3$ base tank = 110.3 g.
Final vol. base tank = 1.08 l.*
Final $Na_2CO_3$ concentration base tank = 141.7 g/l.
Total final amount $Na_2CO_3$ base tank = 141.7 × 1.08 = 153 g/l.
$Na_2CO_3$ formed = 153 − 110.3 = 42.7 g.
Equiv. wt. $Na_2CO_3$ = 53

$$Na_2CO_3 \text{ (at 100\% efficiencyy)} = \frac{8 \times 3600 \times 3 \times 53}{96,500} = 47.5 \text{ g}.$$

*80 cm$^3$ vol. increase due to electro-osmotic water transfer from the acid zone to the base zone was observed.

Therefore, the actual current efficiency was:

$$(42.7/47.5) \times 100 = 89.9\%$$

Stainless steel wires were placed next to the cathodic surface of the first cation permselective membrane and next to the cathodic surface of the second cation permselective membrane to measure the voltage per cell pair.

The voltage per cell pair at 8 amperes of D.C. current (40 amp/ft.$^2$) was 1.5 volts. The power consumption was calculated as follows:

D.C. power consumption = 8 × 1.5 = 12 watts or 0.012 KWH/H.
$Na_2CO_3$ formed = 42.7/3 = 14.2 g/hr. = 0.0312 lb./hr.
KWH/lb. = 0.012/0.0312 = 0.3846 or
0.3846 × 2000 = 769 KWH/ton 100% $Na_2CO_3$ The foregoing power requirement is remarkably low in contrast with existing comparable processes.

Thus, converting the power required for $Na_2CO_3$ to that required for NaOH, the same is 1020 KWH/ton 100% NaOH. But the DuPont Nafion cation exchange membrane system for producing NaOH needs about 2000 to 2200 KWH/ton 100% NaOH, and the former mercury system for producing NaOH needs about 3000 to 3400 KWH/ton 100% NaOH.

EXPERIMENTAL EXAMPLE NO. 2

| System | |
|---|---|
| Acid Side | Base Side |
| NaCl, Na$_2$S | NaHCO$_3$ |

The same cell used in Example No. 1 was charged as follows:
Acid zone: same as in Example No. 1.
Base Zone: solution of 62.5 g/l NaHCO$_3$.
Electrode compartments: same as in Example No. 1.
Operating conditions were the same as in Example No. 1, except that no CO$_2$ gas was injected into the base tank, and the time of electrification was 2 hrs. instead of 3 hrs. The results of this run were as follows:
Acid Zone
Insoluble CuS collected = 25.8 g.

$$\text{CuS (at 100\% efficiency)} = \frac{8 \times 3600 \times 2 \times 47.75}{96,500} = 28.5 \text{ g.}$$

Current efficiency = (25.8/28.5) × 100 = 90.5%
Base Zone
Initial vol. = 1.0 l.
Initial NaHCO$_3$ conc. = 62.5 g/l.
Initial amount NaHCO$_3$ = 62.5 g.
Final vol. = 1.050 l.*
Final NaHCO$_3$ conc. = 17.3 g/l.
Final amount NaHCO$_3$ = 17.3 × 1.050 = 18.2 g.
NaHCO$_3$ reacted = 62.5 − 18.2 = 44.3 g.
Equiv. wt. NaHCO$_3$ = 84

NaHCO$_3$ reacted (100% efficiency) =

$$\frac{8 \times 3600 \times 2 \times 84}{96,500} = 50.1 \text{ g.}$$

Current efficiency = (44.3/50.1) × 100 = 88.4%
*50 cm$^3$ of volume increase was observed due to electro-osmotic water transfer.

EXPERIMENTAL EXAMPLE NO. 3

| System | |
|---|---|
| Acid Side | Base Side |
| Na$_2$SO$_4$, Na$_2$S | Na$_2$CO$_3$, CO$_2$ |

The same cell as in Example No. 1 was used, and charged as follows:
Acid Zone
Solution of 63.2 g/l Na$_2$SO$_4$ and 42.0 g/l Na$_2$S.
Base Zone
Solution of 110.5 g/l of Na$_2$CO$_3$.
Electrode compartments: 100 g/l of NaOH.
Operating conditions: Same as in Example No. 1.
The results for this experiment were:
Acid zone
Insoluble CuS collected = 38.5 g.
CuS at 100% efficiency = 42.8 g.
Current efficiency = 38.5/42.8 = 90.0%
Base Zone
Initial vol. = 1.0 l.
Initial Na$_2$CO$_3$ concentration = 110.5 g/l.
Initial amount Na$_2$CO$_3$ = 110.5 g.
Final vol. = 1.075 l.*
Final Na$_2$CO$_3$ concentration = 142.0 g/l.
Final amount Na$_2$CO$_3$ = 142 × 1.075 = 152.6 g.
Na$_2$CO$_3$ formed = 152.6 − 110.5 = 42.1 g.
Current efficiency = (42.1/47.5) × 100 = 88.6%
*75 CM$^3$ of volume increase was observed due to electro-osmotic water transfer.

EXPERIMENTAL EXAMPLE NO. 4

| System | |
|---|---|
| Acid Side | Base Side |
| Na$_2$SO$_4$, Na$_2$S | NaHCO$_3$ |

The same apparatus and operating conditions of Example No. 2 were employed, except that the acid zone was charged with Na$_2$SO$_4$ electrolyte instead of NaCl. Solutions were as follows:
Acid Zone
65 g/l Na$_2$SO$_4$, 43 g/l Na$_2$S solution.
Base Zone
63 g/l NaHCO$_3$ solution.
Electrode compartments: 100 g/l NaOH.
The results of the run were as follows:
Acid Zone
Insoluble CuS collected = 26.1 g.
CuS at 100% efficiency = 28.5 g.
Current efficiency = (26.1/28.5) × 100 = 91.6%.
Base Zone
Initial vol. = 1.0 l.
Initial NaHCO$_3$ conc. = 63.0 g/l.
Initial NaHCO$_3$ amount = 63.0 g.
Final vol. = 1.048 l.*
Final NaHCO$_3$ conc. = 16.8 g/l.
Final amount of NaHCO$_3$ = 16.8 × 1.048 = 17.6 g.
NaHCO$_3$ reacted = 63.0 − 17.6 = 45.4 g.
NaHCO$_3$ reacted at 100% efficiency = 50.1 g.
Current efficiency = 45.4/50.1 = 90.6%.
*48 CM$^3$ of volume increase was observed due to electro-osmotic water transfer.

In FIG. 2 there is shown an electrodialytic apparatus 300 embodying a modified form of the invention and designed to be used in a plant having the same purpose as that of the plant shown in FIG. 1, namely, to convert Na$_2$SO$_4$, e.g. in the form of an ore thereof, into various commercial chemicals, specifically, H$_2$SO$_4$ and Na$_2$CO$_3$.

As in the case of the electrodialytic apparatus shown in FIG. 1, the electrodialytic apparatus 300 is the heart of the modified plant. This electrodialytic apparatus includes a stack 302 illustrated here in simplistic form, or, more specifically, shown here only to consist of a single cell, although it will be understood that, in practice, i.e. on a commercial basis, the stack will consist of a large number of such cells arranged in series, as was the case with that stack 88 of FIG 1B. The single cell of the stack 302 in FIG. 2 is denoted by the reference numeral 304 and constitutes an acid zone 306 and a base zone 308. The acid zone is defined on one side by a cation permselective membrane 310, and on the other side by a bi-polar membrane 312, the cation permselective face of which confronts the acid zone 306 and, hence, the cation permselective membrane 310. The base zone 308 is defined by a second cation permselective membrane 314 and by the same bi-polar membrane 312, the anion permselective face of which confronts the base zone 308 and, hence, the second cation permselective membrane 314.

Suitable water-impermeable electrically non-conductive peripheral gaskets (not shown) separate the cation permselective membrane 310 from the bi-polar membrane 312, the bi-polar membrane 312 from the cation permselective membrane 314, the cation permselective membrane 310 from the cathode electrode 316, and the cation permselective membrane from the anode electrode 318.

Also, as is customary, spacers (not shown) that are electrically non-conductive and water-permeable separate these above-mentioned components.

Thus, as in the case of the cells described with respect to the stack 88, the cells of the stack 302 constitute a pair of cation permselective membranes between which a bipolar membrane is sandwiched, being spaced and insulated therefrom.

The electrodialytic apparatus 300 further includes a cathode electrode 316, and an anode electrode 318, which are connected to a source of D.C. voltage as indicated.

A suitable D.C. voltage for the plant under consideration is 1.5 volts per cell.

The cation permselective face of the bi-polar membrane faces the cathode electrode. The anion permselective face of the bi-polar membrane faces the anode electrode. The cathode electrode 316 is spaced and insulated from the cation permselective membrane 310 to form a cathode compartment 320. The anode electrode 318 is spaced and insulated from the cation permselective membrane 314 to define an anode compartment 322.

It will be appreciated that, except for the number of cells shown—and this is not significant—the stacks 88 and 302 are essentially identical as to their physical components. However, as shortly will be seen, these stacks differ as to the electrolytes that circulate through the base zones, although not as to the electrolytes that circulate through the acid zones and electrode compartments.

The electrolyte circuit for the electrode compartments 320, 322 is the same as has been described in detail with respect to FIG. 1, namely, there is an NaOH tank 324 from which NaOH solution is pumped through a line 326 and branches 328, 330 to the anode compartment 322 and the cathode compartment 320, respectively. From there, the NaoH solution leaves through branches 332, 334 from the cathode and anode compartments, respectively, to return via a common line 336 to the NaOH tank 324. The effluent from the cathode compartment additionally contains $H_2$, and from the anode compartment additionally contains $O_2$. These two gases are vented from the NaOH tank.

Insofar as the circulation of electrolytes through the acid zone is concerned, this is essentially the same in the FIG. 2 electrolytic apparatus 300 as it is in the electrodialytic apparatus 62. A water solution of $Na_2S$ and $Na_2SO_4$ is introduced into the acid zone 306 through a line 338. The source of such solution can be the same as it is in the case of the FIG. 1 plant. The effluent from the acid zone leaves through a line 340, and contains a water solution of $Na_2SO_4$ plus $H_2S$. The $H_2S$ is removed in a separator 342. This gas may be burned as suggested earlier to provide a source of heat for commercial and industrial use, or it may be burned in the $Na_2SO_4$ reduction kiln if economy of energy is required in the operation of the plant and it is desired to eliminate to the greatest extent possible the purchase of any external energy. The $Na_2SO_4$ with the $H_2S$ removed then is fed to a leaching vat 344 which has solid $Na_2S$ 346 fed to it as from an $Na_2SO_4$ roasting kiln. A water solution of $Na_2S$ and $Na_2SO_4$ now is fed back to the line 338.

Although the circulation of liquids with respect to the acid zone is essentially the same in the two electrodialytic apparatuses 62 and 300, this does not hold true of the circulation of electrolyte for the base zone. The liquid introduced into the base zone is conducted to it by a line 350 containing an unsaturated solution of $NaHCO_3$ and $Na_2CO_3$. It should be observed that this is in contrast to the liquid introduced into the base zones of the electrodialytic apparatus 62, wherein the liquid introduced into the base zones is a saturated solution of $NaHCO_3$. Because this liquid is a mixture of the water solutions of $Na_2CO_3$ and $NaHCO_3$, there is not an excess of free $OH^-$ ions, thereby attaining a high efficiency for the base zone. The $NaHCO_3$ is caused to be present by the introduction of gaseous $CO_2$ from a source 352 into a carbonator 354 in a line 356 leading to the carbonator. The line 356 contains a water solution of $Na_2CO_3$ without $NaHCO_3$. The effluent from the base zone 308 leaves through a line 358, and contains a water solution of $Na_2CO_3$, the $NaHCO_3$ having been reacted with $OH^-$ ions in the base zone to form $Na_2CO_3$. This water solution of $Na_2CO_3$ is drawn off through a line 360 to suitable equipment such as an evaporator to remove the water, either by heat, or by vacuum, or by a combination thereof, and leave essentially dry $Na_2CO_3$ containing either one water of crystallization or anhydrous $Na_2CO_3$ which are commercially desirable end products. Some of the water solution of $Na_2CO_3$ from the line 358 is diverted back to the line 356, water being added from a source 362 to bring the $Na_2CO_3$ solution to the desired balance.

It should be pointed out that in this embodiment of the invention, it is not necessary to use a $NaHCO_3$ kiln such as the kiln 154 of FIG. 1C to convert $NaHCO_3$ to $Na_2CO_3$.

It thus will be seen that there are provided processes and apparatuses which achieve the various objects of the invention and which are well adapted to meet the conditions of practicel use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention, there is claimed as new and desired to be secured by Letters Patents:

1. A process for the electrodialysis of aqueous solutions of $Na_2S$ and $Na_2SO_4$ with impurities in an electrodialysis apparatus having
 I. a cathode electrode in a cathode compartment,
 II. an anode electrode in an anode compartment
 III. between which is located an electrodialysis cell,
 IV. constituting acid and base zones, said electrodialysis cell being composed of
 V. alternating cation permselective membranes and bi-polar membranes, each bi-polar membrane having a cation permselective face and an anion permselective face,
 VI. each acid zone being defined by a cation permselective membrane spaced from and confronting a cation permselective face of a bi-polar membrane and
 VII. each base zone being defined by a cation permselective membrane spaced from and confronting an anion permselective face of a bi-polar membrane,
 VIII. all of the bi-polar membranes being so arranged that their anion permselective faces face the anode electrode and their cation permselective faces face the cathode electrode,
said process comprising the steps of:

(a) introducing an aqueous solution of $Na_2S$ and $Na_2SO_4$ with impurities into acid zones of the electrodialysis cell;

(b) introducing an aqueous solution of a sodium salt selected from the group consisting of
   (i) $NaHCO_3$ and
   (ii) a mixture of $NaHCO_3$ and $Na_2CO_3$ (c) passing direct current through the electrodialysis cell between the cathode electrode and the anode electrode to traverse the acid zones and the base zones thereby to produce an aqueous solution of $Na_2SO_4$, $H_2S$ gas and free $H^+$ ions in the acid zones and converting $NaHCO_3$ to $Na_2CO_3$ and produce free $OH^-$ ions in the base zones;

(d) the $Na_2S$ in the acid zones reducing the free $H^+$ ion concentration in the acid zones and the $NaHCO_3$ in the base zones reducing the free $OH^-$ ion concentration in the base zones to raise the current efficiencies of said zones;

(e) withdrawing from the acid zones sodium sulfate in water solution and $H_2S$ gas; and (f) withdrawing from the base zones water solutions from the groups consisting of a water solution of $Na_2CO_3$ and a mixture of a water solution of $Na_2CO_3$ and $NaHCO_3$.

2. A process as set forth in claim 1 wherein there is intoduced into the acid zones an aqueous solution principally constituting $Na_2SO_4$ and $Na_2S$ in water and wherein there is introduced into the base zones an aqueous solution principally constituting a mixture of $NaHCO_3$ and $Na_2CO_3$ in water.

3. A process as set forth in claim 1 wherein there is introduced into the acid zones an aqueous solution principally constituting $Na_2SO_4$ and $Na_2S$ in water and wherein there is introduced into the base zones an aqueous solution principally constituting saturated $NaHCO_3$ in water.

4. The process as set forth in claim 3, wherein the saturated $NaHCO_3$ introduced into the base zones is at least partially converted therein into $Na_2CO_3$, where an aqueous solution principally constituting a mixture of $Na_2CO_3$ and $NaHCO_3$ leaves the base zones and wherein the aqueous solution of $Na_2CO_3$ and $NaHCO_3$ leaving the base zones is carbonated to produce an aqueous saturated solution of $NaHCO_3$ containing crystals of $NaHCO_3$.

5. A process as set forth in claim 4 wherein at least a part of the saturated solution of $NaHCO_3$ produced by carbonation is cooled to a precipitate additional crystals of $NaHCO_3$.

6. A process as set forth in claim 5 wherein the crystals of $NaHCO_3$ are separated from the saturated aquwous solution of $NaHCO_3$ and at least a part of the saturated aqueous solution of $NaHCO_3$ is fed back into the base zones.

7. A process as set forth in claim 6 wherein the solid crystals of $NaHCO_3$ separated from the saturated aqueous solution of $NaHCO_3$ are heated to dry the same and to convert the $NaHCO_3$ into $Na_2CO_3$.

8. A process as set forth in claim 7 wherein the solid crystals of $NaHCO_3$ are heated to a temperature of about 300° C. to produce $Na_2CO_3$.

9. A process as set forth in claim 1 wherein there is introduced into the acid zones an aqueous solution principally constituting $Na_2SO_4$ and $Na_2S$ in water and wherein there is introduced into the base zones and aqueous solution principally constituting a mixture of $Na_2CO_3$ and $CO_2$ in water which react to form a water solution of $NaHCO_3$.

10. A process as set forth in claim 1 wherein the $NaHCO_3$ that was converted to $Na_2CO_3$ by electrodialysis in the base zone is converted back to $NaHCO_3$ by carbonation externally of the base zone.

11. Process as set forth in claim 1 wherein a water solution of $NaOH$ is introduced into the anode and cathode compartments and is withdrawn from the anode and cathode compartments, the $NaOH$ solution withdrawn from the anode compartment containing oxygen gas and the water solution of $NaOH$ withdrawn from the cathode compartment containing hydrogen gas.

12. In a method for the conversion of ore-contained $Na_2SO_4$ into commercially useful chemicals employing the process of claim 1 the further steps comprising:

(a) subjecting the ore to heat in the presence of a carbonaceous material to reduce the ore-contained $Na_2SO_4$ to $Na_2S$ and to release $CO_2$;

(b) leaching the $Na_2S$ of preceding step (a) with water and with the aqueous solution of $Na_2SO_4$ produced in the acid zone of step (d) of claim 1 to form an aqueous solution of $Na_2S$ and $Na_2SO_4$;

(c) burning the $H_2S$ produced in the acid zone to create useful heat;

(d) using the $SO_2$ resulting from the burning of the $H_2S$ to produce sulfuric acid.

13. In a method set forth in claim 12 the additional step comprising using the $H_2S$ to subject the ore to heat in the presence of a carbonaceous material.

14. In a method as set forth in claim 13 the additional step comprising using a fossil fuel to heat the ore in the presence of the carbonaceous material and using the heat produced by the $H_2S$ for a purpose other than heating the ore in the presence of a carbonaceous material.

* * * * *